Nov. 8, 1927. Re. 16,784

L. O. GRONDAHL

RAILWAY SIGNALING

Original Filed Dec. 9, 1921 2 Sheets-Sheet 1

INVENTOR:
L. O. Grondahl,
by A. R. Vincell
His Attorney

Nov. 8, 1927.

Re. 16,784

L. O. GRONDAHL

RAILWAY SIGNALING

Original Filed Dec. 9, 1921

2 Sheets-Sheet 2

INVENTOR:

L. O. Grondahl, by A. R. Vencill

His Attorney

Reissued Nov. 8, 1927. Re. 16,784

UNITED STATES PATENT OFFICE.

LARS O. GRONDAHL, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA.

RAILWAY SIGNALING.

Original application filed December 9, 1921, Serial No. 521,147. Renewed August 2, 1926. Original No. 1,619,928, dated March 8, 1927. Application for reissue filed July 21, 1927. Serial No. 207,551.

My invention relates to railway signaling, and is particularly well adapted to signaling of the type wherein roadside signals are governed by track circuits which in turn are controlled by the passage of cars or train along the track.

I will describe several forms of signaling apparatus embodying my invention, and will then point out the novel features thereof in claims.

Figure 1:
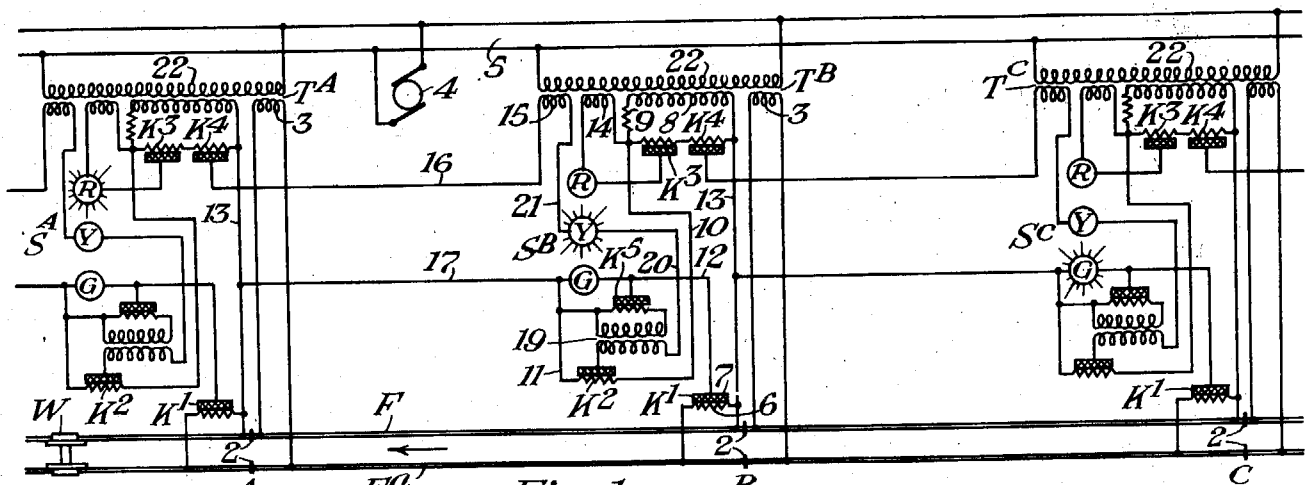
Figure 2:
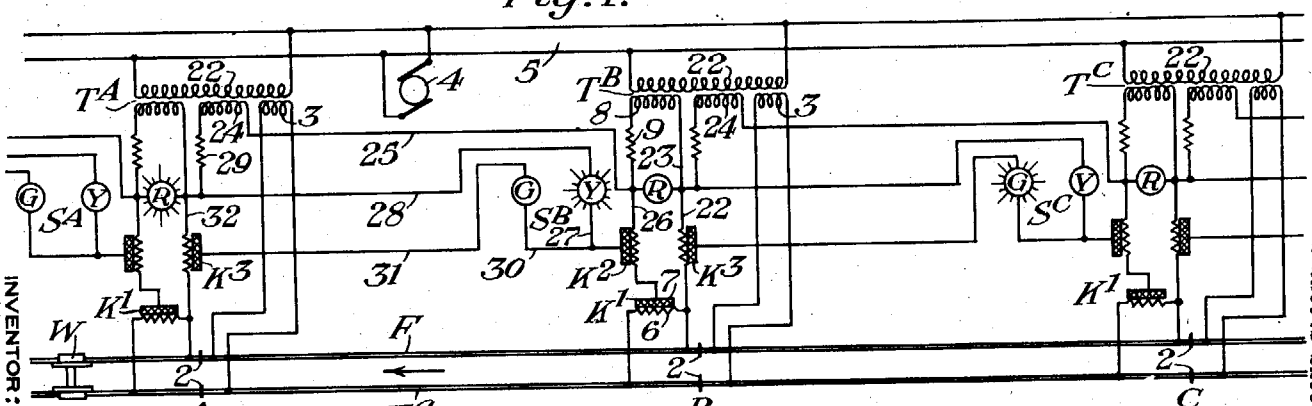
Figure 3:
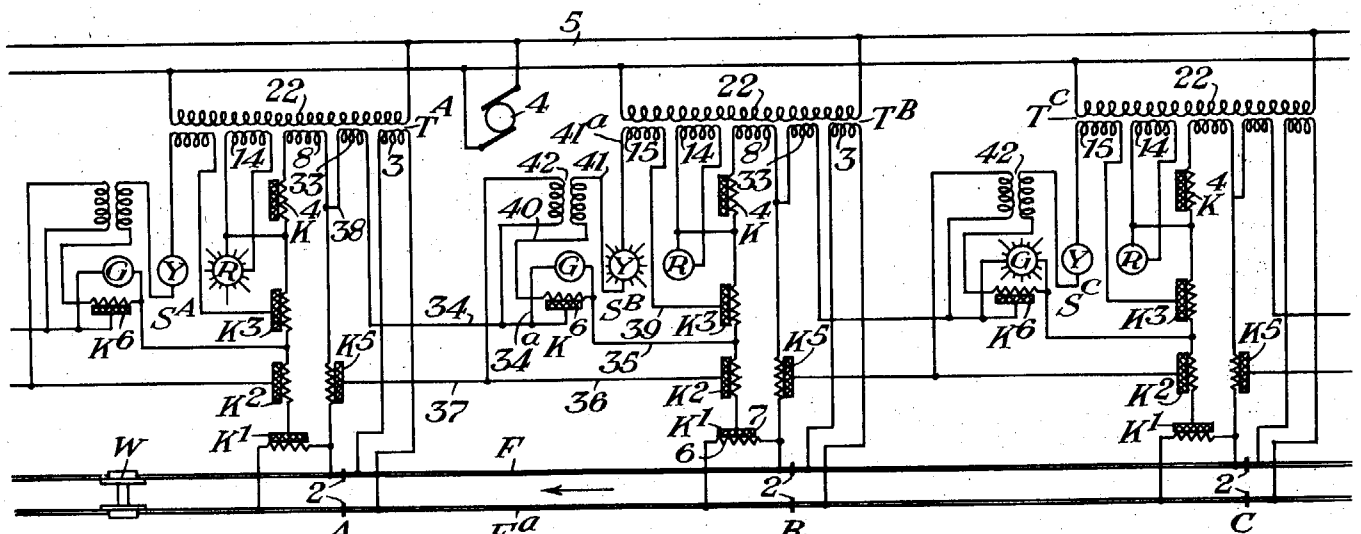

In the accompanying drawings, Fig. 1 is a diagrammatic view showing one form of apparatus embodying my invention. Figs. 2 and 3 are views showing modifications of the apparatus shown in Fig. 1.

Similar reference characters refer to similar parts in each of the several views.

Referring first to Fig. 1, the reference characters F and $F^a$ designate the track rails of a railway along which traffic normally moves in the direction indicated by the arrow. These rails are divided into a plurality of successive track sections A—B, B—C, C—D, etc., the isolation of the track sections being accomplished, as here shown, by insulated joints 2 in both of the lines of rails. Any other suitable method of isolating the sections may be employed, however, without departing from the spirit and scope of my invention.

Located adjacent the entrance end of each track section is a signal designated by the reference character S, with an exponent corresponding to the location. Each signal, as here shown, comprises three lamps G, Y and R, which, when lighted, indicate "proceed", "caution" and "stop", respectively.

Each track section is provided with a track circuit comprising a source of current and a relay. As here shown, the source of current for each track circuit is the secondary 3 of a transformer designated by the reference character T with an exponent corresponding to the location, the primary 22 of which is connected with a transmission line 5 to which alternating current is constantly supplied by a generator 4. The relay for each track circuit is designated $K^1$, and is of the thermo-sensitive type comprising a heating element 6 and thermo-sensitive element 7, the heating element being connected across the rails adjacent the entrance end of the section. The thermo-sensitive relay $K^1$ has a negative temperature coefficient, that is, the resistance of the element 7 decreases with increase of temperature, and so with increase of current flowing in the heating element 6.

Referring specifically to signal $S^B$, the proceed lamp G is provided with a circuit which passes from the left-hand terminal of secondary 8 of transformer $T^B$, through a ballast resistance 9, wire 10, heating element of a thermo-sensitive relay $K^2$, wire 11, lamp G, wire 12, thermo-sensitive element of the relay $K^1$, and wire 13 to the right-hand terminal of secondary 8. Connected across the secondary 8 and in shunt with the other elements of the circuit just traced are the heating elements of two thermo-sensitive relays $K^3$ and $K^4$. Each relay $K^2$, $K^3$ and $K^4$ has a negative temperature coefficient. The parts of this circuit are so adjusted that when relay $K^1$ is energized, that is, when track section A—B is unoccupied, sufficient current flows through lamp G to light this lamp and the current in the heating element of relay $K^2$ is sufficient to energize this relay. The drop in voltage across the several elements in the circuit is then such that relays $K^3$ and $K^4$ are de-energized. When section A—B is occupied by a car or train, however, relay $K^1$ is de-energized and the current which then flows through lamp G is insufficient to light this lamp. The voltage drop across lamp G and relays $K^1$ and $K^2$ is then such that relays $K^3$ and $K^4$ become energized.

The stop lamp R for signal $S^B$ is provided with a circuit which includes a secondary 14 of transformer $T^B$ and the thermo-sensitive element of relay $K^3$. The parts of this circuit are so adjusted that when relay $K^3$ is de-energized, lamp R is extinguished, but that when relay $K^3$ becomes energized, such as when section A—B is occupied by a car or train, the amount of current which flows in the circuit is sufficient to light the stop lamp R.

The caution lamp Y for signal $S^B$ is provided with a circuit which passes from the left-hand terminal of secondary 15 of transformer $T^B$, through wire 16, thermo-sensitive element of relay $K^4$ at location A, wires 13, 17 and 11, thermo-sensitive element of relay $K^2$, primary of transformer 19, wire 20, lamp Y, and wire 21 to secondary 15 of transformer $T^B$. The parts of this circuit are so adjusted that when relays $K^4$ and $K^2$ are both energized, the current which flows in lamp Y is sufficient to light this lamp, but that when either of the said relays becomes de-energized, the current is reduced to such value that lamp Y is extinguished.

The secondary of transformer 19 is connected with the heating element of a thermo-sensitive relay $K^5$ having a negative temperature coefficient and the thermo-sensitive element of which is connected across the terminals of the proceed lamp G. The purpose of this transformer and relay is to suppress or extinguish lamp G when the caution lamp Y of the same signal is burning. To do this, the parts are so adjusted that when lighting current is supplied to lamp Y, the secondary of transformer 19 delivers sufficient current to energize relay $K^5$, so that a shunt of low resistance is provided around lamp G. When lamp Y is extinguished, however, the current in transformer 19 is not of sufficient value to energize relay $K^5$, and so the shunt around lamp G has a comparatively high resistance, and this shunt does not then divert sufficient current from lamp G to extinguish this lamp.

As shown in the drawing, the track section to the left of location A is occupied by a car or train W, so that relay $K^1$ at location A is de-energized. Lamp G of signal $S^A$ is accordingly extinguished and the same thing is true of lamp Y, because of the fact that relay $K^2$ at location A is de-energized. Relay $K^3$ at location A is energized, however, so that stop lamp R is lighted. At location B the stop lamp R is extinguished because the associated relay $K^3$ is de-energized. The caution lamp Y is lighted, however, because relay $K^2$ at signal $S^B$ and relay $K^4$ at signal $S^A$ are both energized. The proceed lamp G of signal $S^B$ is extinguished because the adjacent relay $K^5$ is energized. At signal $S^C$ the stop lamp R is extinguished because the adjacent relay $K^3$ is de-energized, and the caution lamp Y is extinguished because relay $K^4$ at location B is de-energized. The proceed lamp G is lighted, however, because the adjacent track relay $K^1$ is energized.

Referring now to Fig. 2, the track circuits are the same as in Fig. 1, but the control of the signals by these track circuits is somewhat different. Considering location B, for example, the track relay $K^1$ controls a circuit which passes from the left-hand terminal of secondary 8 of transformer $T^B$, through resistance 9, heating element of a relay $K^2$, thermo-sensitive element of relay $K^1$, heating element of a relay $K^3$, and wires 22 and 23 to the secondary 8 of transformer $T^B$. The stop lamp R is connected in this circuit in shunt around relays $K^2$, $K^1$ and $K^3$, so that this lamp is connected with secondary 8, but with a resistance 9 interposed between the secondary and the lamp. The parts of the circuit are so adjusted that when relay $K^1$ is energized, relays $K^2$ and $K^3$ are also energized and the voltage across lamp R is insufficient to light this lamp; but that when relay $K^1$ is de-energized, due, for example, to the presence of a car or train in section A—B, relays $K^2$ and $K^3$ also become de-energized and the voltage which is then applied to lamp R is sufficient to illuminate this lamp.

The proceed lamp G of signal $S^B$ is provided with a circuit which passes from the left-hand terminal of secondary 24 of transformer $T^A$, through resistance 29, wire 32, thermo-sensitive element of relay $K^3$ at location A, wire 31, lamp G, wire 30, thermo-sensitive element of relay $K^2$ at location B, and wires 26 and 25 to secondary 24 of transformer $T^A$. The parts of this circuit are so adjusted that lamp G is lighted only when relay $K^3$ at location A and relay $K^2$ at location B are both energized.

The caution lamp Y at location B is provided with a circuit which passes from secondary 24 of transformer $T^A$, through resistance 29, wire 28, lamp Y, wire 27, thermo-sensitive element of relay $K^2$, and wires 26 and 25 to secondary 24 of transformer $T^A$. The parts of this circuit are so adjusted that lamp Y is lighted when the adjacent relay $K^2$ is energized provided that lamp G of the same signal is extinguished. To accomplish this operation of lamps G and Y, lamp G is preferably a low voltage lamp, such as 6 volts, while lamp Y is a high voltage lamp, such as 110 volts. The resistance 29 being in series with both lamps, it is then obvious that lamp G and thermo-sensitive relay $K^3$ constitute a shunt of low resistance around lamp Y, so that when lamp G is illuminated lamp Y will be extinguished.

As shown in the drawing, the track section to the left of location A is occupied by a car or train W so that track relay $K^1$ at location A is de-energized. It follows that lamp R of signal $S^A$ is lighted because of the high resistance of the thermo-sensitive element of relay $K^1$, and so signal $S^A$ indicates stop. As for signal $S^B$, the stop lamp R is extinguished because the adjacent relay $K^1$ is energized, and the proceed lamp G is extinguished because relay $K^3$ at location A is de-energized. The caution lamp Y is lighted, however, because the adjacent relay $K^2$ is energized. In signal $S^C$ the stop lamp R is extinguished because the adjacent relay $K^1$ is energized, and the proceed lamp G is lighted because the adjacent relay $K^2$ and the relay $K^3$ at location B are both energized. The caution lamp Y is extinguished because this lamp is shunted by lamp G of the same signal and relay $K^3$ at location B.

Referring now to Fig. 3, the track circuit is again the same as in Fig. 1, but the control of the signal lamps by the track relays is accomplished with a still different arrangement of circuits and apparatus. In this view each track relay $K^1$ controls a circuit which includes the secondary 8 of the adjacent transformer T, as well as the heating elements of four thermo-sensitive relays $K^2$, $K^3$, $K^4$ and $K^5$, all of which relays will consequently be energized when the corresponding track section is unoccupied and de-energized when the track section is occupied.

The stop lamp R of each signal is connected directly across secondary 14 of the adjacent transformer $T^B$, but this lamp is provided with a shunt or branch circuit which includes the thermo-sensitive element of the adjacent relay $K^4$.

The parts of this circuit are so adjusted that lamp R will be extinguished when relay $K^4$ is energized, and lighted when relay $K^4$ is de-energized; that is, when relay $K^4$ is energized the resistance of the thermo-sensitive element of this relay is so low that sufficient current is diverted from lamp R to extinguish the lamp, or to express the matter in another way, the voltage across this lamp is then insufficient to light the lamp.

The proceed lamp G of signal $S^B$ is provided with a circuit which passes from secondary 33 of transformer $T^A$, through wires 34 and $34^a$, lamp G, wire 35, thermo-sensitive element of relay $K^2$ at location B, wires 36 and 37, thermo-sensitive element of relay $K^5$ at location A, and wire 38 to secondary 33 of transformer $T^A$. The parts of this circuit are so adjusted that lamp G is lighted when both relays $K^2$ and $K^5$ are energized, but extinguished when either of these relays is de-energized.

The caution lamp Y of signal $S^B$ is included in a circuit which passes from secondary 15 of transformer $T^B$, through wire $41^a$, lamp Y, wire 41, primary of transformer 42, wire 40, heating element of relay $K^6$, wire 35, thermo-sensitive element of relay $K^3$ and wire 39 to secondary 15. This circuit is so adjusted that lamp Y is lighted when relay $K^3$ is energized, provided that the secondary of transformer 42 is not supplied with current by induction from the primary of this transformer which primary is connected directly across wires 34 and 37 in the circuit for the proceed lamp G. When transformer 42 at location B is energized by current from secondary 33 at location A, however, the current flowing in lamp Y from the adjacent secondary 15 is suppressed so that lamp Y is extinguished. On the other hand, when lamp Y is lighted, the adjacent relay $K^6$ is energized and the thermo-sensitive element of this relay then forms a low resistance shunt around the adjacent lamp G so that this lamp is extinguished.

As shown in the drawing, the section to the left of location A is occupied by a car or train W, so that track relay $K^1$ at location A is de-energized with the result that relays $K^4$, $K^3$, $K^2$ and $K^5$ at this location are also de-energized. Owing to the fact that relay $K^4$ is de-energized, the stop lamp R of signal $S^A$ is lighted, so that this signal indicates stop. Considering signal $S^B$, the proceed lamp G is extinguished because relay $K^5$ at location A is de-energized. The caution lamp Y is lighted because relay $K^3$ at location B is energized and the primary of transformer 42 is de-energized, due to the fact that relay $K^5$ at location A is de-energized. The stop lamp R is extinguished because the adjacent relay $K^4$ is energized. At signal $S^C$ the proceed lamp G is lighted because relay $K^2$ at this signal and relay $K^5$ at location B are both energized. The caution lamp Y is extinguished because the current supplied to this lamp by the adjacent secondary 15 is neutralized by current supplied to the adjacent transformer 42 from secondary 33 of transformer $T^B$. The stop lamp R is extinguished because the adjacent relay $K^4$ is energized.

I have found that of the thermo-sensitive materials suitable for use in thermo-sensitive relays, those having negative temperature coefficients are more numerous and more conveniently handled than those having positive temperature coefficients. Furthermore, it is known that the coefficients of the negative temperature coefficient substances are enormously greater in general than the coefficients of the positive temperature coefficient substances that may be readily utilized. It follows, therefore, that for relays of this character substances having negative temperature coefficients are preferable to substances having positive temperature coefficients. One feature of the present invention is that all of the thermo-sensitive relays have negative temperature coefficients.

Although I have herein shown and described only three forms of signaling apparatus embodying my invention, it is understood that various changes and modifications may be made therein within the scope of the appended claims without departing from the spirit and scope of my invention.

Having thus described my invention, what I claim is:

1. In combination, a plurality of successive sections of railway track, a track circuit for each section including a source of current and the heating element of a thermo-sensitive relay $K^1$; a signal for each section comprising proceed, caution and stop lamps; a circuit for the proceed lamp of each signal including a source of current, the thermo-sensitive element of relay $K^1$ and the heating element of a thermo-sensitive relay $K^2$; a branch for each proceed circuit passing around said lamp, thermo-sensitive element, and heating element, including the heating elements of two thermo-sensitive relays $K^3$ and $K^4$; a circuit for the stop lamp of each signal including a source of current and the thermo-sensitive element of relay $K^3$; a circuit for the caution lamp of each signal including a source of current, the thermo-sensitive element of the adjacent relay $K^2$, the thermo-sensitive element of relay $K^4$ at the next signal in advance and the primary of a transformer; a thermo-sensitive relay $K^5$ for each signal the heating element of which is connected with the adjacent transformer, and a shunt around each proceed lamp including the thermo-sensitive element of the adjacent relay $K^5$.

2. In combination, a plurality of successive sections of railway track a track circuit for each section including a source of current and the heating element of a thermo-sensitive relay $K^1$; a signal for each section comprising proceed, caution and stop lamps; a circuit for the proceed lamp of each signal including a source of current, the thermo-sensitive element of relay $K^1$ and the heating element of a thermo-sensitive relay $K^2$; a branch for each proceed circuit passing around said lamp, thermo-sensitive element and heating element and including the heating elements of two thermo-sensitive relays $K^3$ and $K^4$; a circuit for the stop lamp of each signal including a source of current and the thermo-sensitive element of relay $K^3$; a circuit for the caution lamp of each signal including a source of current, the thermo-sensitive element of the adjacent relay $K^2$, and the thermo-sensitive element of relay $K^4$ at the next signal in advance; and means for each signal controlled by the flow of current in the caution lamp for preventing the supply of current to the proceed lamp.

3. In combination, a stretch of railway track comprising a plurality of successive sections, signals for said sections and train-controlled means for governing said signals comprising thermo-sensitive relays each made up of a heater and a thermo-sensitive element and all such thermo-sensitive elements having negative temperature coefficients.

4. In combination, a stretch of railway track comprising a plurality of successive sections, signals for said sections each adapted to indicate proceed, caution and stop, and train-controlled means for governing said sections comprising thermo-sensitive relays each made up of a heater and a thermo-sensitive element and all such thermo-sensitive elements having negative temperature coefficients.

5. In combination, a stretch of railway track comprising a plurality of successive sections, signals for said sections each adapted to give at least two indications, train-controlled means for governing said signals, and means for each signal including a thermo-sensitive relay controlled by the current which causes the signal to give one indication for preventing the signal from simultaneously giving a different indication.

6. In combination, a stretch of railway track comprising a plurality of successive sections, signals for said sections each having at least two devices adapted when supplied with current to give contradictory indications, and means for each signal including a thermo-sensitive relay controlled by the current supplied to one device for preventing the simultaneous supply of current to another device in the same signal.

7. In combination, two successive sections of railway track, a track circuit for each section including a source of current and the heating element of a thermo-sensitive relay having a negative temperature coefficient, a signal for the rear section including a device adapted when energized to cause the signal to indicate proceed, and means controlled by the thermo-sensitive elements of said thermo-sensitive relays and effective only when both of said sections are unoccupied for causing said device to be energized.

8. In combination, two successive sections of railway track, a track circuit for each section including a source of current and the heating element of a thermo-sensitive relay having a negative temperature coefficient, a signal for the rear section including a lamp adapted when energized to indicate proceed, and means controlled by the thermo-sensitive elements of said thermo-sensitive relays and effective only when both of said sections are unoccupied for causing said lamp to be energized.

9. In combination, two successive sections of railway track, a thermo-sensitive relay for each section, train controlled means for said sections for causing the relay for the rear section to be conductive only when its section is unoccupied and the relay for the forward section to be conductive only when its section is occupied, and a signal for the rear section controlled by said relays and adapted to indicate caution when both of said relays are conductive.

10. In combination, two successive sections of railway track, a thermo-sensitive relay for each section, train controlled means for said sections for energizing one relay when its section is unoccupied and the other relay when its section is occupied, and a signal controlled by said relays and adapted to indicate caution when both relays are energized.

11. In combination, two successive sections of railway track, a thermo-sensitive relay for each section, train controlled means for said sections for energizing the relay for the rear section when its section is unoccupied and the relay for the forward section when its section is occupied, and a signal controlled by said relays and indicating caution when both relays are energized.

12. In combination, a track circuit comprising track rails, a source of current and a heating unit; a second circuit including an element exposed to heat from said unit and having the characteristics of varying in electrical resistance with changes of temperature, and a signal controlled by said second circuit.

13. In combination, an element having the characteristic of varying in electrical resistance in response to changes of temperature, an electrical heating unit associated with said element, train controlled means for varying the current supplied to said heating unit, and a railway traffic governing device responsive to changes in the resistance of said element due to changes in the heating current supplied to said unit and arranged to give one indication in response to a steady resistance of one value and a different indication in response to a steady resistance of a different value.

14. In combination with the rails of a railway track, a source of current and a heating unit connected therewith, a circuit independent of said track rail circuit and including an element having a negative temperature coefficient exposed to heat from said unit, and a signal controlled by said circuit.

15. In combination with the rails of a railway track, a source of current and a heating unit connected therewith, an element having a negative temperature coefficient exposed to heat from said unit, and a circuit independent of said track rail circuit and including said element for controlling a signal lamp.

16. In combination, a railway track, a heating unit, train-controlled means for supplying current to said unit, an element exposed to heat from said unit and having the characteristic of varying in electrical resistance with changes in temperature, a circuit independent of said train-controlled means and including said element, and a signal controlled by said circuit.

17. In combination, a railway track, a heating unit, train-controlled means for supplying current to said unit, an element having a negative temperature coefficient exposed to heat from said unit, a circuit distinct from said train-controlled means and including said element, and a signal controlled by said circuit.

18. In combination, a track circuit comprising track rails, a source of current and a heating unit; an element exposed to heat from said unit and having the characteristic of varying in electrical resistance with changes of temperature, and a railway traffic governing device responsive to changes in the resistance of said element due to changes in the heating current supplied to said unit and arranged to give one indication in response to a steady resistance of one value and a different indication in response to a steady resistance of a different value.

19. In combination, an element having a negative temperature coefficient, an electrical heating unit associated with said element, train-controlled means for varying the current supplied to said heating unit, and a railway traffic governing device responsive to changes in the resistance of said element due to changes in the heating current supplied to said unit and arranged to give one indication in response to a steady resistance of one value and a different indication in response to a steady resistance of a different value.

20. In combination, a section of railway track, an element having the characteristic of varying in electrical resistance in response to changes in temperature, an electrical heating unit associated with said element, means for supplying more heating current to said heating unit when said section is unoccupied than when the section is occupied, and a traffic governing device responsive to changes in the resistance of said element due to changes in the heating current supplied to said unit and arranged to give one indication in response to a steady resistance of one value and a different indication in response to a steady resistance of a different value.

21. Railway signaling apparatus comprising a section of track, a circuit including a heating unit, means for supplying current to said circuit when said section is unoccupied but not when it is occupied, an element exposed to heat from said unit and having the characteristic of varying in electrical resistance in response to changes in temperature, a second circuit independent of said first circuit and including said element, and a signal controlled by said second circuit.

22. In combination, a section of railway track, a track circuit for said section including a source of current and a heating unit, an element receiving heat from said unit and responsive to temperature variations by varying in resistance, a plurality of secondary heating units controlled by said element, a secondary temperature-responsive element for each secondary unit receiving heat from the unit, and a signal for the section controlled by said secondary elements.

23. In combination, a relay comprising a thermo-sensitive element and a heating unit, train-controlled means for varying the current supplied to said heating unit, and a railway traffic controlling device controlled as to its indication by changes in the resistance of said element due to changes in the amount of current supplied to said heating unit.

24. In combination, a relay comprising a thermo-sensitive element and a heating unit, train controlled means for varying the current supplied to said heating unit, and a railway traffic controlling device selectively responsive to different steady values of the resistance of said thermo-sensitive element as determined by different steady values of the current in said heating unit.

25. In combination, a track circuit comprising track rails and a source of current, a relay comprising a heating unit connected with said track rails and a thermo-sensitive element exposed to heat from said unit, and a railway traffic controlling device selectively responsive to different steady values of the resistance of said thermo-sensitive element as determined by different steady values of the current supplied to said heating unit from said track rails.

In witness whereof I affix my signature.

LARS O. GRONDAHL.